US012638941B2

(12) United States Patent
Yun et al.

(10) Patent No.: US 12,638,941 B2
(45) Date of Patent: May 26, 2026

(54) TOUCH DETECTION DEVICE FOR SUPPRESSING EMI EFFECT

(71) Applicant: G2touch Co., Ltd., Seongnam-si (KR)

(72) Inventors: Dong-Won Yun, Seongnam-si (KR); Ji-Woon Won, Seongnam-si (KR)

(73) Assignee: G2touch Co., Ltd., Seongnam-si (KR)

( * ) Notice: Subject to any disclaimer, the term of this patent is extended or adjusted under 35 U.S.C. 154(b) by 0 days.

(21) Appl. No.: 19/260,667

(22) Filed: Jul. 7, 2025

(65) Prior Publication Data

US 2026/0044234 A1     Feb. 12, 2026

(30) Foreign Application Priority Data

Aug. 7, 2024    (KR) ........................ 10-2024-0105141

(51) Int. Cl.
G06F 3/041          (2006.01)
G06F 3/044          (2006.01)
G06F 3/045          (2006.01)

(52) U.S. Cl.
CPC ...... G06F 3/04182 (2019.05); G06F 3/04166 (2019.05); *G06F 3/0446* (2019.05); *G06F 3/045* (2013.01); *G06F 2203/04107* (2013.01)

(58) Field of Classification Search
None
See application file for complete search history.

(56) References Cited

U.S. PATENT DOCUMENTS

| | | | | |
|---|---|---|---|---|
| 11,803,270 B2 * | 10/2023 | Ichiraku | ................ | G06F 3/0446 |
| 2021/0200414 A1 * | 7/2021 | Lee | ........................ | G06F 3/0418 |
| 2025/0208729 A1 * | 6/2025 | Dattalo | ................ | G06F 3/0445 |

* cited by examiner

*Primary Examiner* — Stephen T. Reed
(74) *Attorney, Agent, or Firm* — NKL Law; Jae Youn Kim

(57)          ABSTRACT

A touch detection device includes a panel including a plurality of electrodes regularly arranged in rows and columns, and a sensor driver configured to perform a control operation so that a driving voltage having a waveform of a specific cycle is applied to the electrodes. The sensor driver applies a sensing signal to a specific row and apply a first driving signal to at least one row adjacent to the specific row, applies a second driving signal having a reverse phase to a phase of the first driving signal to consecutive rows adjacent to the at least one row, and applies a ground signal to a row immediately adjacent to the at least one row.

9 Claims, 7 Drawing Sheets

FIRST ROW SENSING A

SECOND ROW B

THIRD ROW C

FOURTH ROW C

FIFTH ROW B

SIXTH ROW A

TOUCH DETECTION DEVICE FOR SUPPRESSING EMI EFFECT

BACKGROUND OF THE INVENTION

Field of the Invention

The present invention relates to a method of driving a touch panel, and more particularly to a touch panel detection device capable of suppressing an electromagnetic interference (EMI) effect.

Description of the Related Art

EMI is unwanted noise or interference in an electrical path or circuit caused by a source, and is also referred to as radio frequency interference. Due to EMI, electronic devices may improperly operate, malfunction, or stop working completely. EMI may be generated by a natural or man-made source, and the effect of EMI may be reduced by using a high-quality electronic device, electrical shielding, and modern error correction. General examples of EMI include electrical noise heard when a mobile phone is placed near powered audio equipment or speakers.

An electric current, which is movement of electric charges, creates a magnetic field, and a moving magnetic field creates an electric current. An electrical conductor may act as an antenna for radio waves. A high-power electrical and wireless source may have an unwanted effect on a remote device. As an electronic device becomes smaller, faster, denser, and more sensitive, the electronic device becomes more susceptible to an effect of radio waves, resulting in EMI.

Such EMI may start from several sources. For example, a high-power wireless and electrical source may cause unwanted EMI. An improperly designed consumer electronic device may cause EMI to other devices.

Meanwhile, a touch panel includes a plurality of electrodes. An object such as a finger or stylus provides input by changing capacitance between electrodes included in the touch panel. In order for the touch panel to detect the input provided by the object, a driving circuit needs to apply a driving signal, and there is a problem in that EMI formed by the driving signal affects the plurality of electrodes and/or a plurality of driving circuits in the panel, and thus detection performance deteriorates.

In addition, a touch operation in the panel recognizes touch input by determining a charge quantity of a capacitor through voltage alternating operations of a plurality of touch cells. During this process, electric fields and magnetic fields are formed due to the voltage alternating operations, which generates EMI. In particular, as a touch area increases, the number of touch cells undergoing alternating operation increases, accelerating the EMI effect. In particular, application of a large TSP (Touch Sensor Panel) is significantly difficult and the worst result in terms of EMI risk is encountered.

Meanwhile, EMI due to touch operation is closely related to load characteristics, so that an EMI radiation amount increases as the load decreases, while the EMI radiation amount decreases as the load increases. Meanwhile, since load characteristics are different for each row of a touch sensor, the EMI radiation amount may be different for each row. In this regard, it is necessary to implement a specific operation algorithm of a touch detection device capable of perfectly offsetting the EMI radiation amount by considering different load characteristics for each row of the touch sensor.

SUMMARY OF THE INVENTION

An object to be solved by the present invention is to relieve this problem. It is another object of the present invention to provide a method of driving a touch panel capable of reducing an EMI effect in the touch panel.

It is a further object of the present invention to alleviate a problem of exhibiting a different amount of EMI for each sensing column since resistance and capacitance components of touch cells in a panel have deviations as the panel increases in size.

It is a further object of the present invention to provide a method of driving a touch panel capable of reducing an influence of EMI deviation in the touch panel.

It is a further object of the present invention to provide a method of effectively canceling an EMI radiation amount by applying an in-phase voltage waveform and a ground potential to a row in addition to an inverse phase voltage around a sensing row, and a touch detection device for suppressing an EMI effect.

It is a further object of the present invention to implement a specific operation algorithm of a touch detection device capable of perfectly canceling an EMI radiation amount by considering different load characteristics for each row of a touch sensor.

In accordance with the present invention, the above and other objects can be accomplished by the provision of a touch detection device including a panel including a plurality of electrodes regularly arranged in rows and columns, and a sensor driver configured to perform a control operation so that a driving voltage having a waveform of a specific cycle is applied to the electrodes. The sensor driver applies a sensing signal to a specific row and apply a first driving signal to at least one row adjacent to the specific row, applies a second driving signal having a reverse phase to a phase of the first driving signal to consecutive rows adjacent to the at least one row, and applies a ground signal to a row immediately adjacent to the at least one row. The sensor driver increases a first variable associated with a position to which the second driving signal is applied or a second variable associated with a number of consecutive rows to which the second driving signal is applied when an electromagnetic interference (EMI) level detected in the electrodes is greater than or equal to a reference value, detects an EMI level of a configuration in which positions and a number of rows to which the second driving signal is applied have changed based on the first variable and the second variable, and selects a combination of rows to which the sensing signal, the first driving signal, the ground signal, and the second driving signal are applied when the EMI level of the changed configuration is less than the reference value.

The sensor driver may be configured to apply the first driving signal of the driving voltage through electrodes in a second row in one direction adjacent to one side of a first row which is the specific row, apply a voltage corresponding to ground through electrodes in a third row in one direction adjacent to one side of the second row, apply the second driving signal having a reverse voltage waveform to a waveform of the voltage corresponding to ground or the driving voltage through electrodes in a fourth row in one direction adjacent to one side of the third row, and sense a voltage through electrodes arranged in the specific row. A size of a third electrode in the third row to which the voltage corresponding to ground is applied may be greater than a size of a second electrode in the second row to which the first driving signal is applied.

According to an embodiment, the sensor driver may apply the first driving signal through electrodes in the second row in the other direction adjacent to the other side of the specific row, apply the voltage corresponding to ground through electrodes in the third row in the other direction adjacent to the other side of the second row in the other direction, and apply the voltage corresponding to ground or the second driving signal through electrodes in the fourth row in the other direction adjacent to the other side of the third row in the other direction. Waveforms of voltages applied to both sides of the specific row may be formed in a symmetrical form.

According to an embodiment, the sensor driver may apply the second driving signal through electrodes in a fifth row in one direction adjacent to one side of the fourth row.

According to an embodiment, a size of a fourth electrode in the fourth row may be the same as the size of the second electrode in the second row. A size of the fifth electrode in the fifth row may be the same as a size of a first electrode in the first row.

According to an embodiment, the sensor driver may apply the voltage corresponding to ground to the fourth row when the same sensor types are applied to the third row and the fourth row, and apply the second driving signal through electrodes in a sixth row in one direction adjacent to one side of the fifth row.

According to an embodiment, a size of a fourth electrode in the fourth row may be the same as the size of the third electrode in the third row, a size of the fifth electrode in the fifth row may be the same as a size of a first electrode in the first row, and a size of a sixth electrode in the sixth row may be the same as the size of the first electrode in the first row.

According to an embodiment, the sensor driver may apply the second driving signal to the fourth row when different sensor types are applied to the third row and the fourth row, and apply the second driving signal through electrodes in a sixth row in one direction adjacent to one side of the fifth row.

According to an embodiment, the size of the second electrode in the second row may be the same as a size of a first electrode in the first row, a size of a fourth electrode in the fourth row may be greater than the size of the third electrode in the third row, and the size of the fourth electrode in the fourth row, a size of a fifth electrode in the fifth row, and a size of a sixth electrode in the sixth row may be the same.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
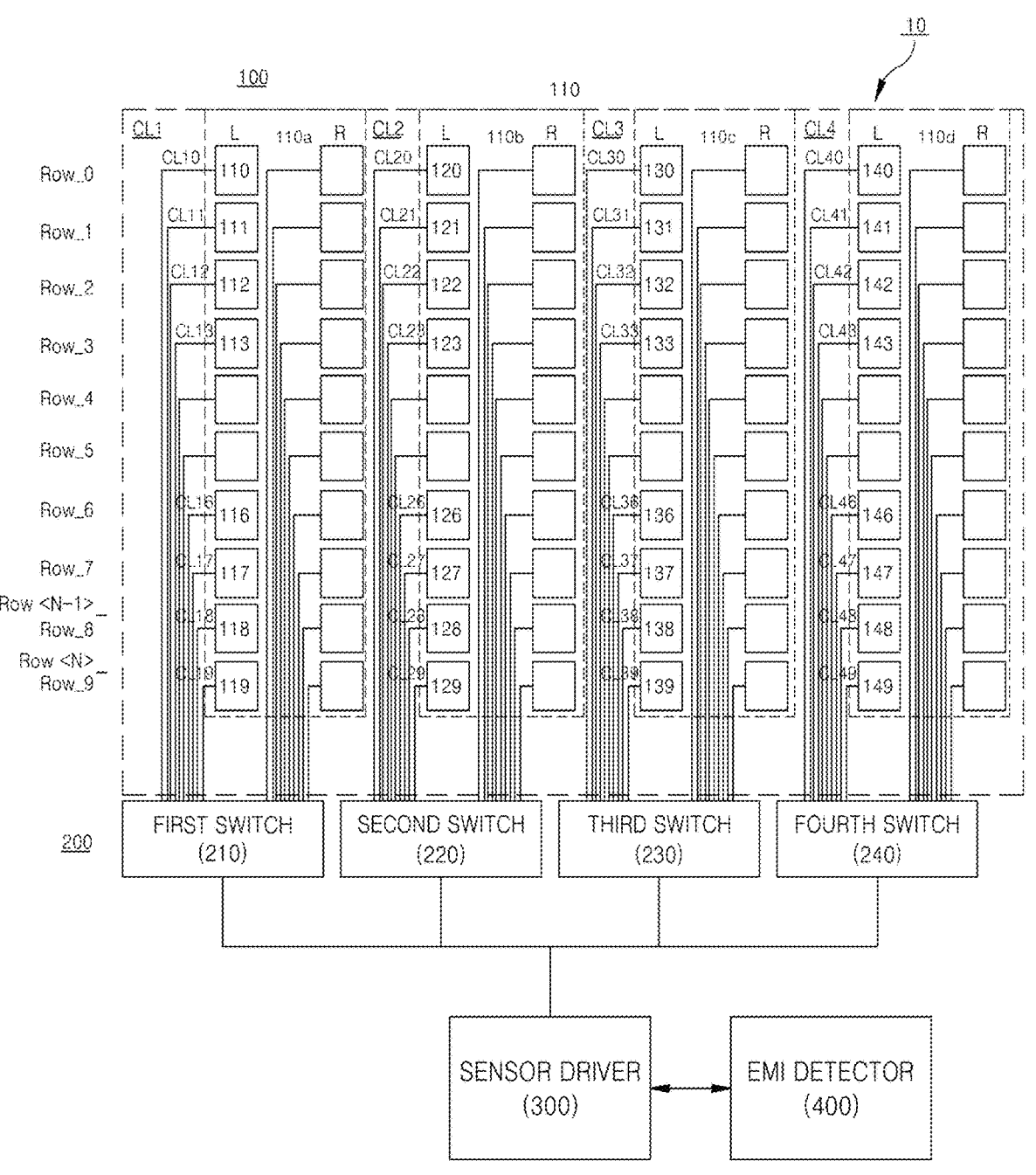
FIG. 1 is a block diagram illustrating a detailed configuration of a touch detection device according to the present invention.

Hereinafter, preferred embodiments of the present invention will be described in detail with reference to the attached drawings. Prior thereto, terms or words used in this specification and claims should not be construed as limited to usual or dictionary meanings, and should be interpreted as having meanings and concepts consistent with the technical idea of the present invention based on the principle that an inventor may appropriately define a concept of a term to describe the invention of the inventor in the best way possible. Therefore, the embodiments described in this specification and the configurations shown in the drawings are only one of the most preferred embodiments of the present invention and do not represent the entire technical idea of the present invention. Thus, it should be understood that, at the time of filing this application, there may be various equivalents and modifications that can replace the embodiments and configurations.

FIG. 1 is a block diagram illustrating a detailed configuration of a touch detection device according to the present invention. Referring to FIG. 1, the touch detection device 10 may include a panel 100, a multiplexer 200, and a sensor driver 300. The touch detection device 10 may further include an EMI detector 400.

The touch detection device 10 may include the panel 100 including a plurality of electrodes regularly arranged in rows and columns, a switch 200 electrically connecting some of the electrodes to form a plurality of sensing channels 110a to 110d, and the sensor driver 300 configured to provide driving signals to the sensing channels 110a to 110d. The sensor driver 300 may perform a control operation so that the same or different driving signals are output to different sensing channels. The sensor driver 300 may perform a control operation so that the timing of rising/falling edges is different between adjacent rows, or may perform a control operation so that driving signals having voltage waveforms in opposite directions are applied, as described below.

As illustrated in FIG. 1, the panel 100 according to the present invention may be a self-dot type panel. In the self-dot type panel 100, the plurality of electrodes is regularly arranged in rows and columns. As illustrated in FIG. 1, the electrodes may be square. According to an embodiment not shown, the electrode may have a shape such as a diamond or a triangle, and may be arranged complementary to electrodes in adjacent rows or columns.

The plurality of electrodes may function as one electrode that forms a capacitor with an object such as a finger or stylus that provides touch input. As the object approaches the panel 100 including the plurality of electrodes, capacitance of a capacitor formed with the electrodes increases. Meanwhile, as the object moves away from the panel 100 including the plurality of electrodes, the capacitance of the capacitor formed with the electrodes decreases.

The switch 200 may include a plurality of switches 210 to 240. The plurality of switches 210 to 240 may be implemented as multiplexers or may be implemented so that only electrodes of some channels are connected.

The plurality of electrodes is connected to the switch 200 via conductive wires. The switch 200 connects the plurality of electrodes in rows or columns to form sensing channels 110a to 110d. In the embodiment illustrated in FIG. 1, the plurality of electrodes is connected in a column direction to form the sensing channels 110a to 110d. In an embodiment not illustrated, the plurality of electrodes may be connected in rows to form sensing channels.

The sensor driver 300 provides driving signals to the sensing channels 110a to 110d to detect a touch input by an object. The embodiment illustrated in FIG. 1 shows an example in which a single driver detects touch input for one panel 100. However, the present invention is not limited thereto. A separate main controller (not illustrated) may control a plurality of sensor drivers, and each of the sensor drivers may drive the sensing channels 110a to 110d.

The sensor driver 300 may provide the same driving signal to a left column L and a right column R included in the sensing channels 110a to 110d. For example, the sensor driver 300 may synchronize a right edge of a driving signal provided to the left column L with a rising edge of a driving signal provided to the right column R. The driving signals may be provided so that a falling edge of the driving signal provided to the left column L and a falling edge of the driving signal provided to the right column R are synchronized with each other. However, the present invention is not limited thereto. For example, the sensor driver 300 may provide driving signals to one sensing channel 110 and another adjacent sensing channel with a phase difference therebetween so that the same edges do not overlap each other.

The sensor driver 300 may provide driving signals in a reversed relationship to the left column L and the right column R included in the sensing channels 110a to 110d. As in the illustrated example, the sensor driver 300 may synchronize the rising edge of the driving signal provided to the left column L with the falling edge of the driving signal provided to the right column R. The falling edge of the driving signal provided to the left column L and the rising edge of the driving signal provided to the right column R may be provided to be synchronized with each other. However, the present invention is not limited thereto. For example, the sensor driver 300 may provide driving signals to one sensing channel 110 and another adjacent sensing channel with a phase difference therebetween.

Meanwhile, the panel 100 may include a plurality of electrodes regularly arranged in rows and columns. The electrodes may be arranged in a first column, a second column, a third column, and a fourth column, respectively. In this regard, the number of the plurality of columns of electrodes is not limited to four and may be changed depending on the application.

The electrodes arranged in the first column may form a first sensing channel 110a. The first sensing channel 110a may include a plurality of electrodes 110 to 119 arranged in a plurality of rows. The electrodes arranged in the second column may form a second sensing channel 110b. The second sensing channel 110b may include a plurality of electrodes 120 to 129 arranged in a plurality of rows. The electrodes arranged in the third column may form a third sensing channel 110c. The third sensing channel 110c may include a plurality of electrodes 130 to 139 arranged in a plurality of rows. The electrodes arranged in the fourth column may form a fourth sensing channel 110d. The fourth sensing channel 110d may include a plurality of electrodes 140 to 149 arranged in a plurality of rows. In this regard, the number of a plurality of rows of the electrodes is not limited to nine and may be changed depending on the application.

The switch 200 may be connected to the electrodes 110, 120, 130, and 140 arranged in a specific column through connection lines CL1, CL2, CL3, and CL4. The sensor driver 300 may be operably coupled with the switch 200. The sensor driver 300 may perform a control operation so that a driving signal of a voltage waveform of a specific cycle is applied to the electrodes 110, 120, 130, and 140.

The connection lines CL1 of the first column may include first to tenth connection lines CL10 to CL19. The connection lines CL2 of the second column may include first to tenth connection lines CL20 to CL29. The connection lines CL3 in the third row may include first to tenth connection lines CL30 to CL39. The connection lines CL3 in the third row may include first to tenth connection lines CL30 to CL39. Lengths of the connection lines CL1, CL2, CL3, and CL4 may be set differently depending on the positions of the electrodes arranged in a specific row.

The sensor driver 300 may be linked with the EMI detector 400 to determine whether an EMI peak value at a specific frequency is less than or equal to a critical size or has decreased by a predetermined value or more based on a maximum value. Meanwhile, the present invention relates to a method of effectively canceling an EMI radiation amount by applying an in-phase voltage waveform and a ground potential to a row in addition to an inverse phase voltage around a sensing row, and a touch detection device for suppressing an EMI effect.

Figure 2:
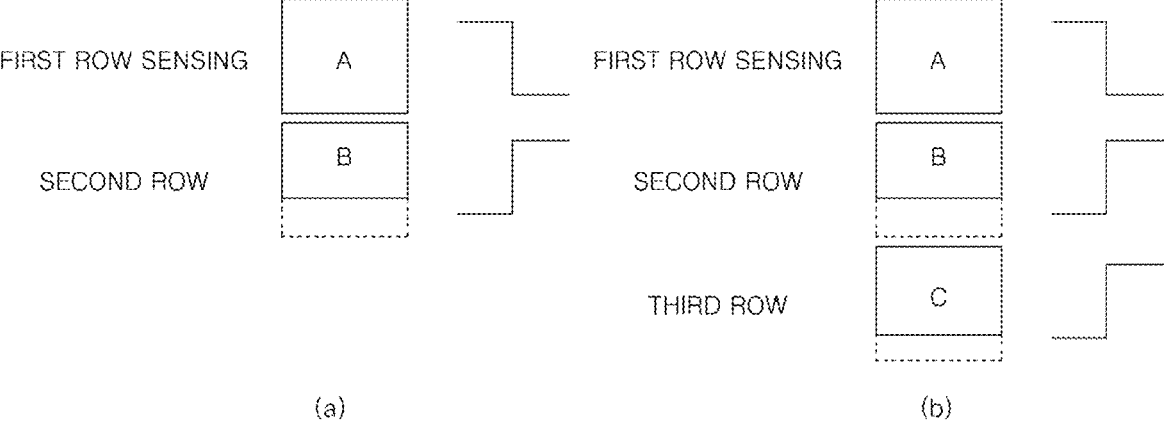
FIG. 2 illustrates voltage waveforms applied between touch sensors of two or three adjacent rows.

Hereinafter, a description will be given of a touch detection device that suppresses an EMI effect according to the present invention. In this regard, FIG. 2 illustrates voltage waveforms applied between touch sensors of two or three adjacent rows. Referring to (a) of FIG. 2, a first row, which is a sensing row, is configured as a sensor A, and a second row, which is an adjacent row, is configured as a sensor B having a size of ⅔ of the sensor A. When a different phase from that of the sensing row is applied only to the second row as in (a) of FIG. 2, EMI of a sensing component in the first row will be canceled, but the second row, which has the opposite phase, will have a low load and thus radiate EMI of an opposite phase component.

Referring to (b) of FIG. 2, two opposite phase voltages in the second row and the third row may be applied to the surrounding rows. When two opposite phase voltages are applied to the second row and the third row as in (b) of FIG. 2, a measured EMI radiation amount of an opposite phase component will be high.

In the case of different loads, such as the different-type sensors of (a) FIG. 2 and (b) of FIG. 2, it is difficult to completely cancel EMI. Therefore, a method of applying only a reverse phase voltage may only be applied to the same type of sensor. In addition, when a reverse phase is applied to a sensor adjacent to the sensing row, it may cause a problem of sensor sensitivity reduction, which may limit practical application.

Therefore, the present invention provides a method of effectively canceling the EMI radiation amount by applying an in-phase voltage waveform and a ground potential to a row in addition to a reverse phase voltage around a sensing row and a touch detection device that suppresses an EMI effect.

In this regard, the EMI radiation amount may be effectively canceled by variably applying an in-phase voltage and a ground potential to a row around a sensing row and then variably applying a reverse phase voltage to a next row. A method of applying the in-phase voltage to the row adjacent to the sensing row is a touch sensitivity compensation method, and it is possible to prevent a phenomenon of sensitivity reduction by applying the reverse phase voltage to the row adjacent to the sensing row.

An effect obtained by applying a ground potential between the sensing voltage and the reverse phase voltage is that EMI of a reverse phase component which is the same as an EMI amount of a sensing component radiated from an adjacent row which operates in phase with the sensing row may be detected. Therefore, setting of a row having an appropriate reverse phase voltage is possible, so that effective EMI cancellation is possible. In this regard, FIG. 3 illustrates a touch detection device in which different-type sensors are arranged adjacent to first to fifth rows and voltage waveforms applied to the respective rows.

Figure 3:
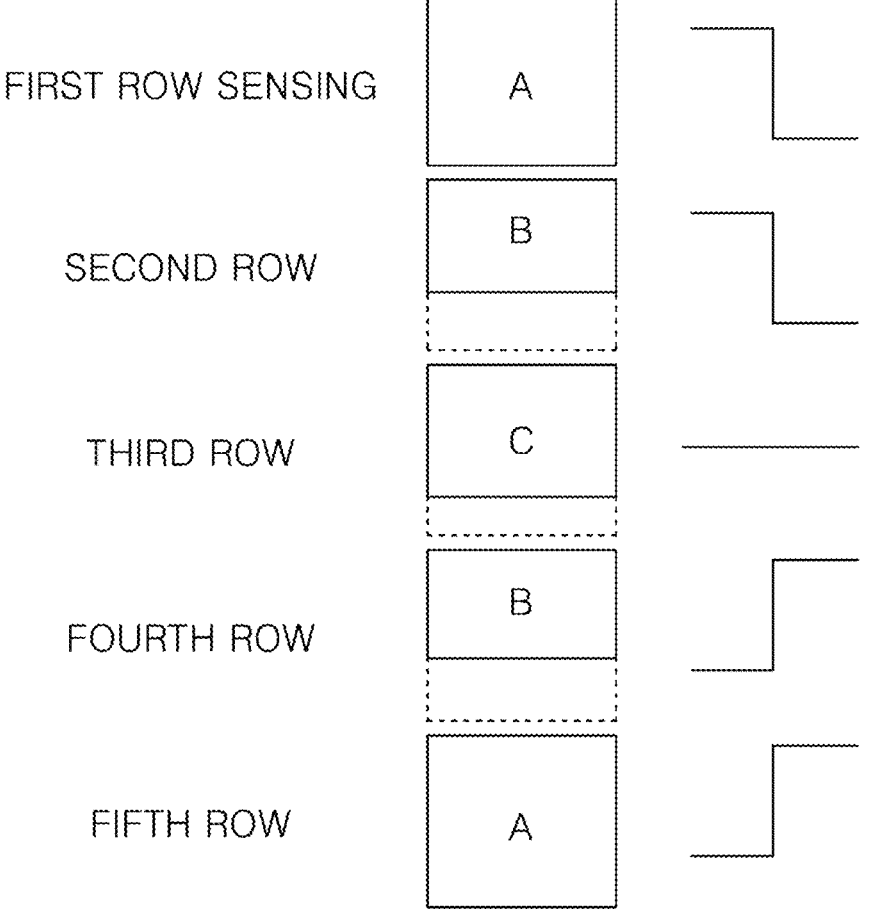
FIG. 3 illustrates a touch detection device in which different-type sensors are arranged adjacent to first to fifth rows and voltage waveforms applied to the respective rows.

Referring to FIG. 3, sensor sizes in the first row and the second row adjacent to the sensing row in the first row are different, and thus loads formed by the sensors in the first row and the second row will be different from each other. As a result, an EMI radiation value is different due to a difference in load, which may be unsuitable for EMI cancellation. On the other hand, the fifth row has the same sensor size as that in the first row, and thus the load is the same. In addition, the fourth row has the same sensor size as that in the second row, and thus the load is the same.

Therefore, in order to compensate for a touch signal in the first row, a signal in phase with the touch signal in the first row may be applied to the second row. A signal in reverse phase may be applied to the fifth row having the same load as that in the first row and the fourth row having the same load as that in the second row, and a ground potential may be applied to the third row. Accordingly, the EMI amount of the sensing component in the first row and the EMI component in the second row having the same phase is equal to the EMI amount of the reverse phase components of the fourth and fifth rows, so that a perfect EMI cancellation effect may be obtained.

That is, in this method, a load identical to or similar to the sensing row is detected for each row and the load is applied in reverse phase to the corresponding row, and in this method, a ground potential is applied to sensor rows therebetween. Accordingly, an efficient EMI cancellation effect may be obtained without additional EMI radiation components.

Figure 4:
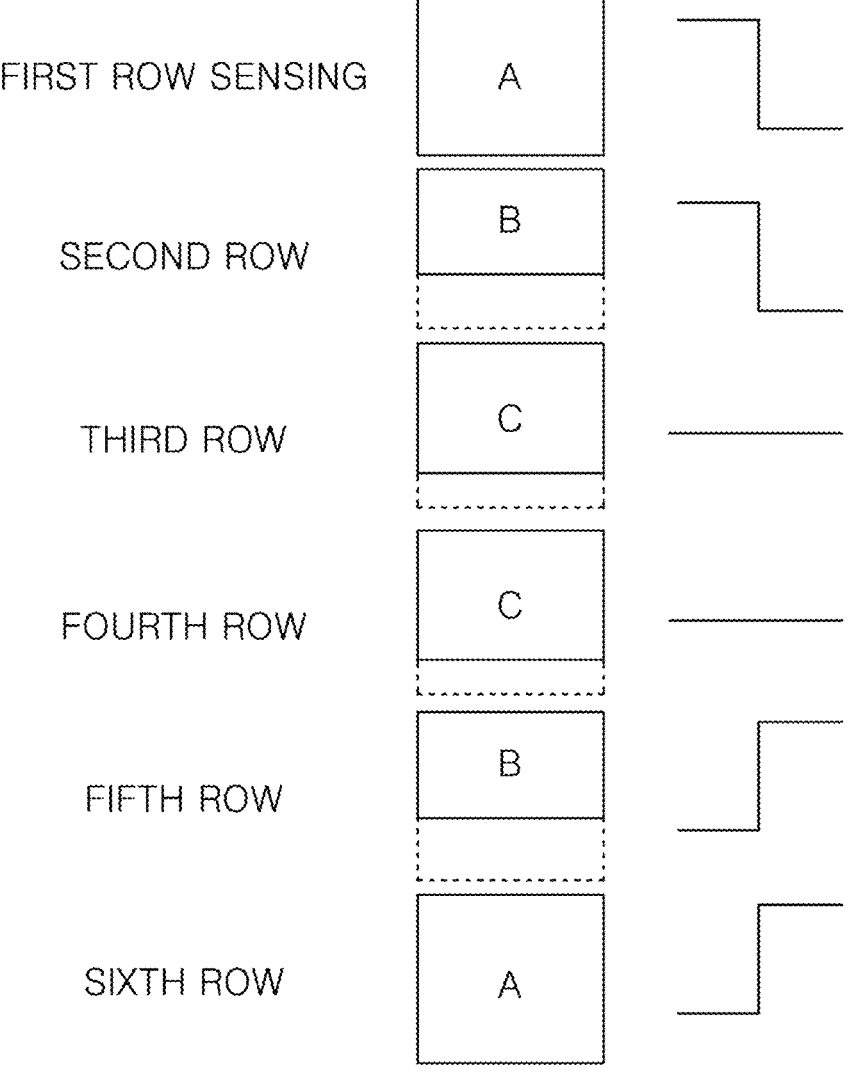
FIG. 4 illustrates a touch detection device in which different-type sensors are arranged in a symmetrical structure adjacent to first through sixth rows and voltage waveforms applied to the respective rows.

Meanwhile, FIG. 4 illustrates a touch detection device in which different-type sensors are arranged symmetrically adjacent to first to sixth rows and voltage waveforms applied to the respective rows. Referring to FIG. 4, rows having the same load as that in the first row, which is a sensing row, and the adjacent second row may be arranged in the fifth row and the sixth row. In this regard, when a ground potential is applied to the third row and the fourth row, and then a reverse phase voltage is applied to the fifth row and the sixth row, an EMI cancellation effect as in FIG. 4 occurs. In this regard, the number of rows to which the ground potential is applied is not limited.

Figure 5:
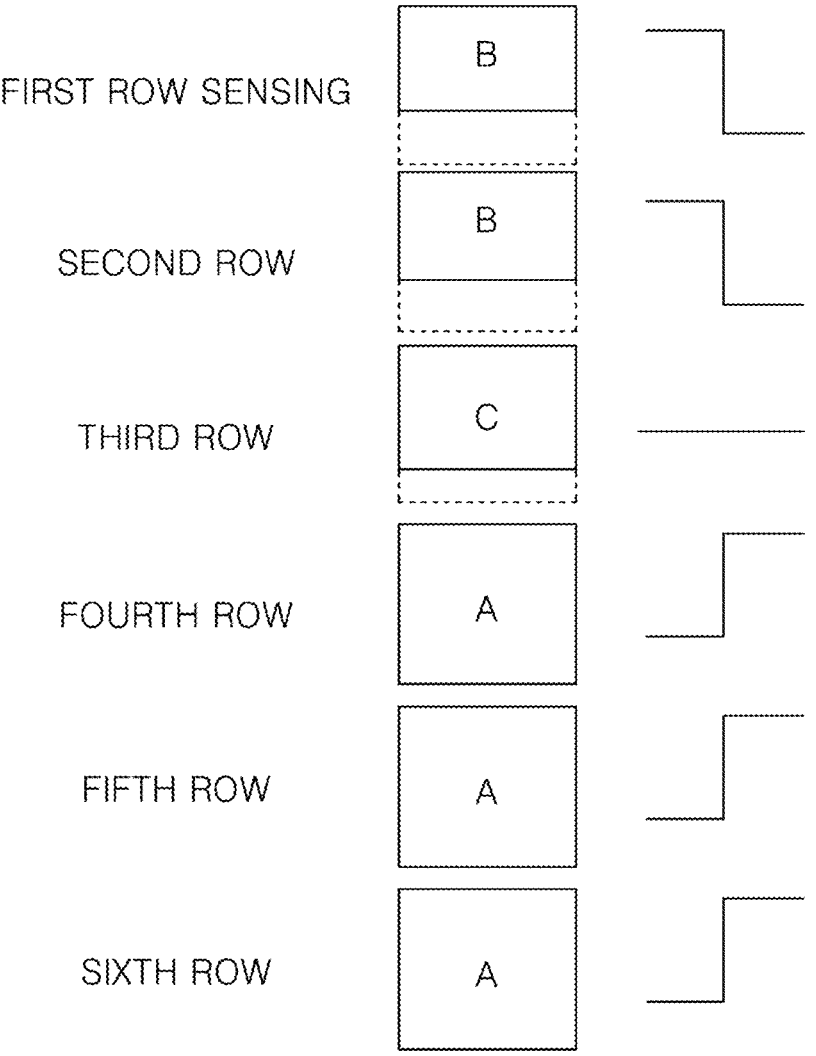
FIG. 5 illustrates a touch detection device in which different-type sensors are arranged in an asymmetrical structure adjacent to first through sixth rows and voltage waveforms applied to the respective rows.

Meanwhile, FIG. 5 illustrates a touch detection device in which different-type sensors are arranged in an asymmetrical structure adjacent to the first to sixth rows, and voltage waveforms applied to the respective rows. Referring to FIG. 5, there is no sensor similar to the sensor B in the second row, and since the load is less than that of a sensor A, an EMI radiation amount is large. In this case, instead of applying the same number of reverse phase signals as the number of rows adjacent to the sensing row, a larger number of reverse phase signals may be applied. By applying one more row to which the reverse phase signal is applied, more effective EMI cancellation is possible when compared to a configuration in which two reverse phase signals are applied. Meanwhile, depending on the application, the number of rows to which the reverse phase signal is applied may be reduced by one more in the opposite configuration.

The present invention prevents a phenomenon of sensitivity reduction by applying a row of the same phase signal to an adjacent row having a reverse phase signal with respect to the sensing row. In addition, when the sensor is designed in various forms as in different-type sensors, the same row as the sensor row may be detected by variably inserting the ground, thereby enabling effective EMI cancellation. Therefore, the core of the present invention is that it is possible to provide an efficient and diverse EMI cancellation method when compared to a configuration in which only the reverse phase signal is applied.

Figure 6:
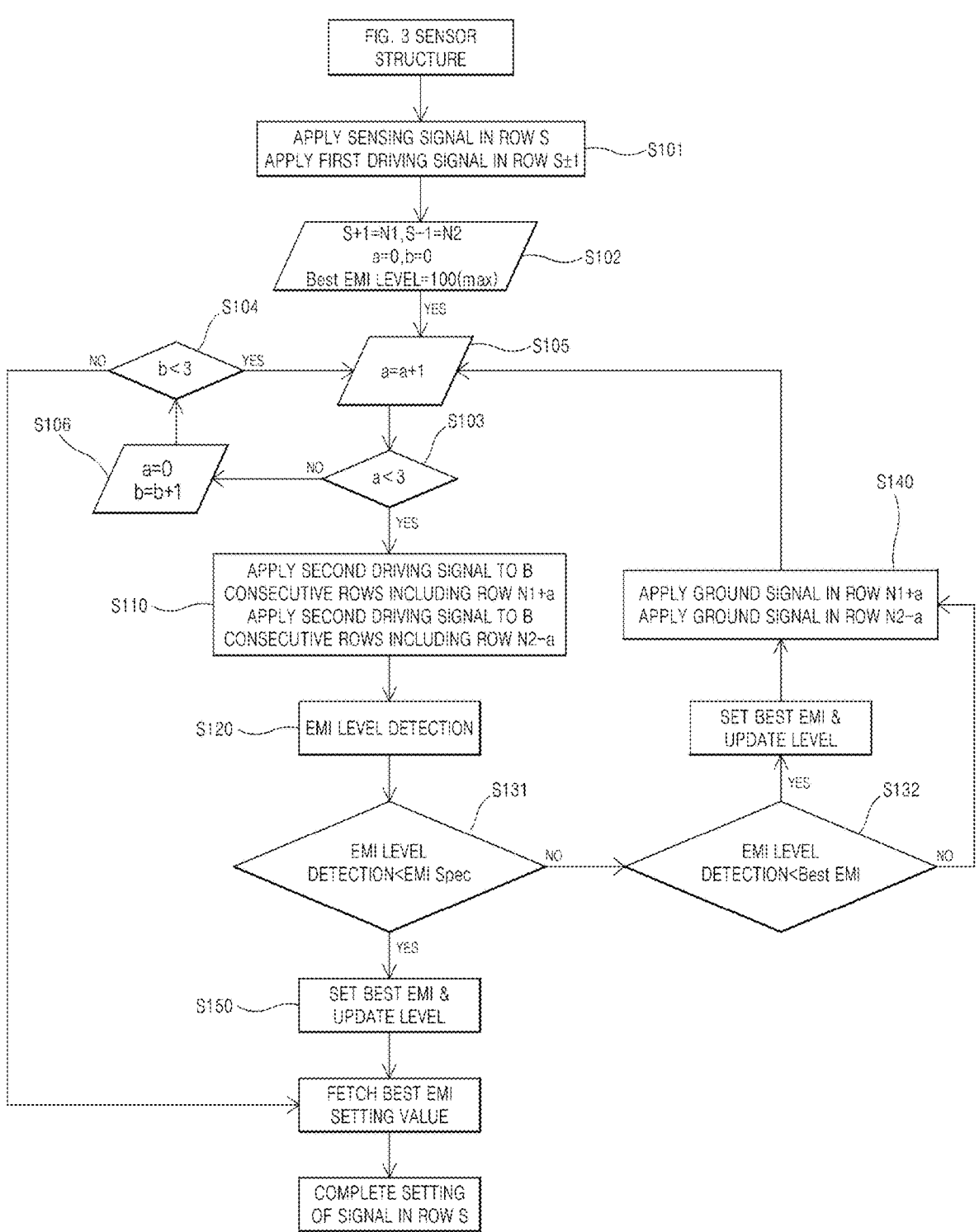
FIG. 6 illustrates a flowchart of a method of detecting touch that suppresses an EMI effect in the touch detection device.

Meanwhile, the touch detection device according to the present specification may be controlled by a method of detecting touch that suppresses the EMI effect. In this regard, FIG. 6 illustrates a flowchart of the method of detecting touch that suppresses the EMI effect in the touch detection device. Hereinafter, the touch detection device for suppressing the EMI effect according to the present invention will be described with reference to FIGS. 1 to 6.

The present invention variably applies the number of rows to which a ground signal is applied and the number of rows to which an inverse phase signal is applied in order to cancel different EMI for each row since the load characteristics are different for each sensor row as in different-type sensors. The present invention finds a row among the first to Nth rows that radiates EMI, the amount of which is equivalent to the amount of EMI radiated from a row adjacent to a sensing row, and applies a signal of an inverse phase of a signal driven from the sensing row to the row. A method is proposed to cancel EMI by applying a signal of an inverse phase to a row that radiates EMI, the amount of which is equivalent to the amount of EMI radiated from a row adjacent to a sensing row.

The row to which the reverse phase signal is applied does not necessarily have to be adjacent to the sensing row or adjacent to the row adjacent to the sensing row, and N rows around the sensing row and the adjacent row are searched for until the EMI specification is satisfied or an optimal EMI value appears. Accordingly, effective EMI attenuation is possible by applying the ground signal and the reverse phase signal to positions of rows satisfying the EMI specification or the optimal EMI value.

Referring to FIGS. 1 to 6, the touch detection device 10 may include the panel 100 and the sensor driver 300. The panel 100 may include a plurality of electrodes (touch sensors) regularly arranged in rows and columns. The sensor driver 300 may perform a control operation so that a driving voltage having a waveform of a specific cycle is applied to the electrodes (touch sensors).

The sensor driver 300 may apply a sensing signal to a row S, which is a specific row, and apply a first driving signal to at least one row (row S±1) adjacent to the row S, which is the specific row (S101). In this regard, a first driving signal may be applied to the row S±1. Referring to FIGS. 3 to 5, the first driving signal may be applied to the row S+1 adjacent to the row S, which is the specific row. For example, the first driving signal may be applied to the second row adjacent to the first row, which is the specific row.

Meanwhile, the sensor driver 300 may set values of N1, N2, a first variable (a), and a second variable (b) (S102) to determine a row N1+a and a row N2−a to which a second driving signal having a phase opposite to that of the first driving signal is to be applied. In this regard, an EMI level may be detected while applying the second driving signal while setting S+1=N1, S−1=N2, a=0, and b=0, and increasing a or b by 1.

The sensor driver 300 may determine whether a value of the first variable (a) associated with positions of the rows to which the second driving signal is applied is less than 3 (S103). The sensor driver 300 may determine whether a value of the second variable (b) associated with the number of rows to which the second driving signal is applied is less than 3 (S104).

The sensor driver 300 may apply the second driving signal to b consecutive rows including the row N1+a (S110). In addition, the sensor driver 300 may apply the second driving signal to b consecutive rows including the row N2−a (S110). Accordingly, the sensor driver 300 may apply the second driving signal to b consecutive rows adjacent to at least one row (row S±1) to which the first driving signal is applied (S110). The second driving signal having a phase opposite to that of the first driving signal may be applied to b consecutive rows adjacent to at least one row (row S±1). The sensor driver 300 may apply the second driving signal having a phase opposite to that of the first driving signal to consecutive rows adjacent to at least one row (row S±1) to which the first driving signal is applied.

The sensor driver 300 may determine whether the EMI level detected at the electrodes is less than a reference value (EMI Spec) (S131). When the detected EMI level is greater than or equal to the reference value (EMI Spec), it is possible to determine whether the detected EMI level satisfies optimal EMI (Best EMI) (S132). When the detected EMI level is greater than or equal to the reference value (EMI Spec) but satisfies the optimal EMI (Best EMI), the sensor driver 300 may apply a ground signal to the row N1+a (S140). When the detected EMI level is lower than the optimal EMI (Best EMI), the sensor driver 300 may apply a ground signal to the row N2−a (S140). Accordingly, the sensor driver 300 may apply a ground signal to the row (row S±2) immediately adjacent to at least one row (row S±1) to which the first driving signal is applied.

When the EMI level detected at the electrodes is greater than or equal to the reference value, the sensor driver 300 may increase the first variable (a) associated with a position to which the second driving signal is applied or the second variable (b) associated with the number of consecutive rows to which the second driving signal is applied (S105 and S106). The sensor driver 300 may detect an EMI level of a configuration in which positions and the number of rows to which the second driving signal is applied are changed based on the first variable (a) and the second variable (b) (S120).

The sensor driver 300 may determine whether the EMI level of the changed configuration is less than the reference value (EMI Spec) (S131). When the EMI level of the changed configuration is greater than or equal to the reference value (EMI Spec), the aforementioned processes are repeated. When the EMI level of the changed configuration is less than the reference value (EMI Spec), it is possible to select a combination of rows to which the sensing signal, the first driving signal, the ground signal, and the second driving signal are applied.

In this regard, a configuration of FIG. 3 is a configuration that satisfies the EMI specification by applying the first variable (a)=1 and the second variable (b)=1. Referring to FIG. 3 and FIG. 6, the sensing signal is applied to the first row, which is a specific row, and the first driving signal is applied to the second row. The first variable (a)=1 is applied, and the ground signal is applied to the third row adjacent to the second row. A position of a row to which the first variable (a)=1 is applied and thus the second driving signal is applied is the fourth row, which is obtained by adding the first variable (a)=1 to the third row. The second variable (b)=1 is applied, and thus the second driving signal is applied to the fourth and fifth rows adjacent to the third row.

A configuration of FIG. 4 is a configuration that satisfies the EMI specification by applying the first variable (a)=2 and the second variable (b)=1. Referring to FIGS. 4 and 6, the sensing signal is applied the first row, which is a specific row, and the first driving signal is applied to the second row. The first variable (a)=2 is applied, and the ground signal is applied to the third and fourth rows adjacent to the second row. A position of a row to which the first variable (a)=2 is applied and thus the second driving signal is applied is the fifth row, which is obtained by adding the first variable (a)=2 to the third row. The second variable (b)=1 is applied, and thus the second driving signal is applied to the fifth and sixth rows adjacent to the fourth row.

A configuration of FIG. 5 is a configuration that satisfies the EMI specification by applying the first variable (a)=1 and the second variable (b)=2. Referring to FIGS. 5 and 6, the sensing signal is applied to the first row, which is a specific row, and the first driving signal is applied to the second row. The first variable (a)=1 is applied, and the ground signal is applied to the third row adjacent to the second row. A position of a row to which the first variable (a)=1 is applied and thus the second driving signal is applied is the fourth row, which is obtained by adding the first variable (a)=1 to the third row. The second variable (b)=1 is applied, and thus the second driving signal is applied to the fourth, fifth, and sixth rows adjacent to the third row.

The sensor driver 300 may apply the first driving signal of the driving voltage through electrodes in the second row in one direction adjacent to one side in the first row, which is a specific row. The sensor driver 300 may apply a voltage corresponding to the ground through electrodes in the third row in one direction adjacent to one side in the second row. The sensor driver 300 may apply the second driving signal having a reverse voltage waveform to a waveform of the voltage corresponding to the ground or the driving voltage through electrodes in the fourth row in one direction adjacent to one side in the third row. Referring to FIGS. 3 and 5, the second driving signal having the reverse voltage waveform may be applied to the fourth row. Referring to FIG. 4, the voltage corresponding to the ground may be applied to the fourth row. Meanwhile, the sensor driver 300 may be configured to sense a voltage through electrodes arranged in the first row, which is a specific row.

Meanwhile, electrodes in adjacent rows included in the panel 100 may be formed in different sizes. Referring to FIGS. 1 to 5, a size of a third electrode of a sensor C in the third row, to which the ground voltage is applied, may be formed to be greater than a size of a second electrode of the sensor B in the second row, to which the first driving signal having the same phase as that of the sensing electrode is applied.

Referring to FIGS. 1 to 5, the size of the first electrode of the sensor A in the first row may be formed differently from the size of the second electrode of the sensor B in the second row. The size of the first electrode of the sensor A in the first row is formed to be greater than the size of the second electrode of the sensor B in the second row, so that the EMI radiation amount has a smaller value. The size of the second electrode of the sensor B in the second row may be formed differently from the size of the third electrode of the sensor C in the third row. The size of the third electrode of the sensor C in the third row may be formed to be greater than the size of the second electrode of the sensor B in the second row and less than the size of the first electrode of the sensor A in the first row. Accordingly, the EMI radiation amount by the sensor C in the third row may be greater than the EMI radiation amount by the sensor A in the first row and less than the EMI radiation amount by the sensor B in the second row.

Meanwhile, in the touch detection device according to the present invention, the sensing row is not limited to the first row and may be any row, and accordingly, the applied voltage may be differently formed. In this regard, FIG. 7 illustrates voltage waveforms applied symmetrically to one side and the other side in the touch detection device in which a voltage in a specific row is sensed.

Figure 7:
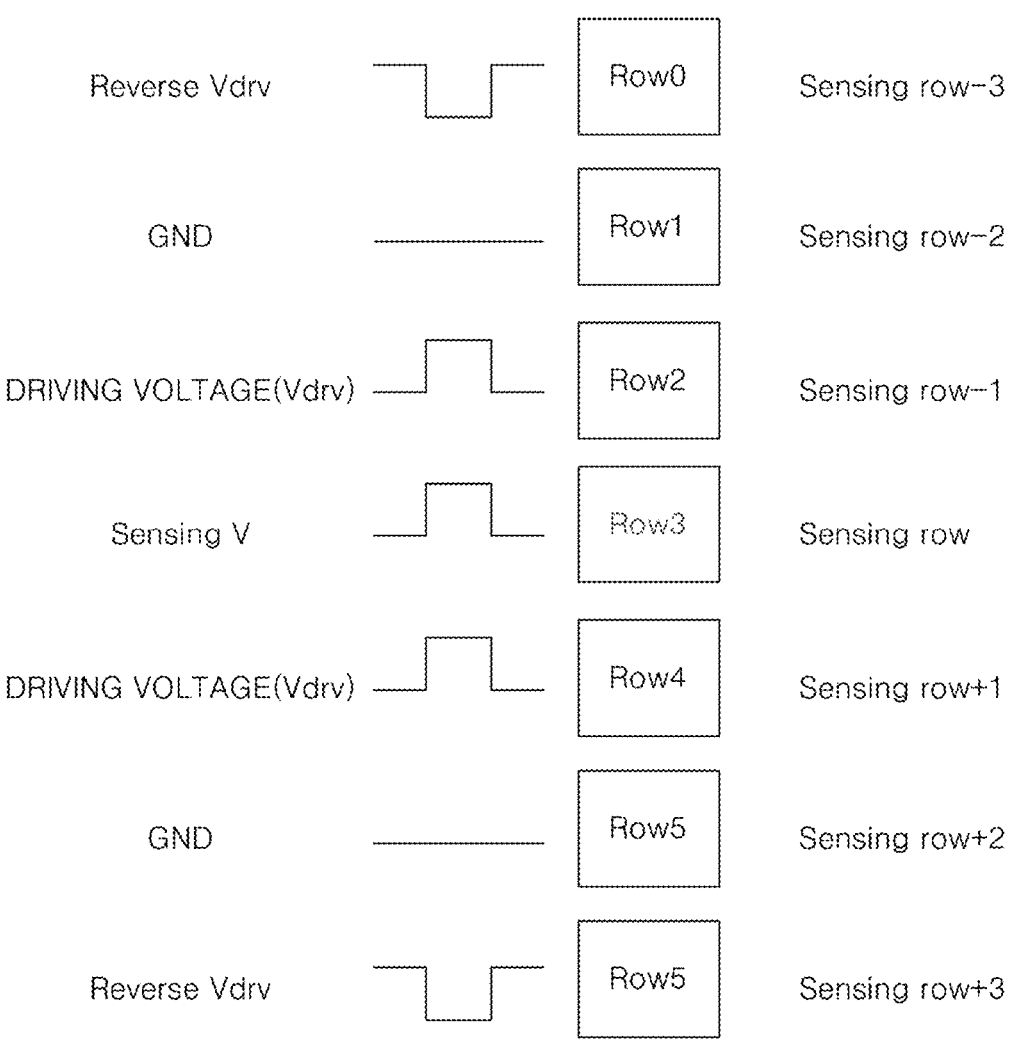
FIG. 7 illustrates voltage waveforms applied in a symmetrical structure to one side and the other side in the touch detection device in which a voltage in a specific row is sensed.

Referring to FIG. 1 and FIG. 7, the sensor driver 300 may be configured to sense the voltage through electrodes arranged in a specific row (raw). The sensor driver 300 may apply the first driving signal of the driving voltage through electrodes of the second row (raw+1) in one direction adjacent to one side of the specific row. The sensor driver 300 may apply the first driving signal through electrodes of the second row (raw−1) in the other direction adjacent to the other side of the specific row.

The sensor driver 300 may apply the voltage corresponding to the ground through electrodes of the third row (raw+2) in one direction adjacent to one side of the second row (raw+1) in one direction. The sensor driver 300 may apply the voltage corresponding to the ground through electrodes of the third row (raw−2) in the other direction adjacent to the other side of the second row in the other direction. The sensor driver 300 may apply the voltage corresponding to the ground through electrodes of the fourth row (raw+3) in one direction adjacent to one side of the third row (raw+2) in one direction.

The sensor driver 300 may apply the second driving signal having a reverse voltage waveform to a waveform of the voltage corresponding to the ground or the driving voltage through electrodes of the fourth row (raw+3) in one direction adjacent to one side of the third row (raw+2) in one direction. The sensor driver 300 may apply the second driving signal having the reverse voltage waveform to the waveform of the voltage corresponding to the ground or the driving voltage through electrodes of the fourth row (raw−3) in the other direction adjacent to the other side of the third row (raw−2) in the other direction. Therefore, waveforms of the voltages applied to both sides with respect to the specific row (raw) may be formed in a symmetrical form.

Meanwhile, in the touch detection device according to the present invention, touch sensitivity may be further improved and EMI may be reduced using the electrodes of the fifth and sixth rows. Referring to FIG. 1 and FIG. 3, the sensor driver 300 may apply the second driving signal having the reverse voltage waveform to the waveform of the driving voltage through electrodes of the fifth row in one direction adjacent to one side of the fourth row.

The sizes of the electrodes in the adjacent rows included in the panel 100 may be formed differently and formed in a symmetrical structure. For example, the size of the first electrode of the sensor A in the first row may be formed to be greater than the size of the second electrode of the sensor B in the second row. The size of the third electrode of the sensor C in the third row may be formed to be greater than the size of the second electrode of the sensor B in the second row and less than the size of the first electrode of the sensor A in the first row. The size of the fourth electrode of the sensor B in the fourth row may be formed to be the same as the size of the second electrode of the sensor B in the second row. The size of the fifth electrode of the sensor A in the fifth row may be formed to be the same as the size of the first electrode of the sensor A in the first row. Accordingly, the electrodes of the second and fourth rows and the electrodes of the first and fifth rows may be formed in a symmetrical structure with respect to the third row.

Meanwhile, referring to FIG. 1 and FIG. 4, when the sensor types applied to the third and fourth rows are the same, the sensor driver 300 may apply the voltage corresponding to the ground to the fourth row. The sensor driver 300 may apply the second driving signal having the reverse voltage waveform to the waveform of the driving voltage through electrodes in the sixth row in one direction adjacent to one side of the fifth row. Therefore, the sensor driver 300 may apply the second driving signal having the reverse voltage waveform through electrodes in the fifth and sixth rows.

The sizes of the electrodes in the adjacent rows included in the panel 100 may be formed differently and formed in a symmetrical structure. For example, the size of the first electrode of the sensor A in the first row may be formed to be greater than the size of the second electrode of the sensor B in the second row. The size of the third electrode of the sensor C in the third row may be formed to be greater than the size of the second electrode of the sensor B in the second row and less than the size of the first electrode of the sensor A in the first row. The size of the fourth electrode of the sensor C in the fourth row may be formed to be the same as the size of the third electrode of the sensor C in the third row. The size of the fifth electrode of the sensor B in the fifth row may be formed to be the same as the size of the second electrode of the sensor B in the second row. The size of the sixth electrode of the sensor A in the sixth row may be formed to be the same as the size of the first electrode of the sensor A in the first row. Therefore, the electrodes in the third row and the electrodes in the fourth row may be formed to have a symmetrical structure. In addition, the electrodes in the second and fourth rows and the electrodes in the first and fifth rows may be formed to have a symmetrical structure.

Meanwhile, referring to FIG. 1 and FIG. 5, when the sensor types applied to the third and fourth rows are different, the sensor driver 300 may apply the second driving signal having the reverse voltage waveform to the waveform of the driving voltage to the fourth row. The sensor driver 300 may apply the second driving signal having the reverse voltage waveform to the waveform of the driving voltage through the electrodes in the sixth row in one direction adjacent to one side of the fifth row. Therefore, the sensor driver 300 may apply the second driving signal having the reverse voltage waveform through the electrodes in the fourth row, the fifth row, and the sixth row.

The sizes of the electrodes in the adjacent rows included in the panel 100 may be formed differently. For example, the size of the first electrode of the sensor B in the first row may be formed to be the same as the size of the second electrode of the sensor B in the second row. The size of the third electrode of the sensor C in the third row may be formed to be greater than the size of the second electrode of the sensor B in the second row. The size of the fourth electrode of the sensor A in the fourth row may be formed to be the same as the size of the third electrode of the sensor C in the third row. The size of the fifth electrode of the sensor A in the fifth row may be formed to be the same as the size of the fourth electrode of the sensor A in the fourth row. The size of the sixth electrode of the sensor A in the sixth row may be formed to be the same as the size of the fifth electrode of the sensor A in the fifth row. Therefore, the second driving signal having the reverse voltage waveform may be applied to the electrodes of the fourth to sixth rows having the largest electrode size.

The touch detection device that suppresses the EMI effect according to the present invention has been described above. The technical effects of the touch detection device that suppresses the EMI effect may be summarized as follows, but are not limited thereto.

According to the present invention, there is an advantage of effectively suppressing the EMI effect in the touch detection device.

According to the present invention, by applying a driving voltage in the form of a reverse voltage to an adjacent column, it is possible to alleviate a phenomenon in which the resistance and capacitance components of touch cells in the panel exhibit increasing deviations as the panel size increases, thereby exhibiting different EMI radiation amounts for each sensing column.

According to the present invention, by applying a driving voltage having a reverse voltage form to an adjacent column, it is possible to alleviate a problem of exhibiting a different amount of EMI for each sensing column since resistance and capacitance components of touch cells in a panel have deviations as the panel increases in size.

According to the present invention, by applying an inverse phase voltage or a driving voltage of the same phase to an adjacent column, it is possible to provide a method of driving a touch panel capable of reducing an influence of EMI deviation on the touch panel.

According to the present invention, it is possible to provide a method of effectively canceling an EMI radiation amount by applying an in-phase voltage waveform and a ground potential to a row in addition to an inverse phase voltage around a sensing row, and a touch detection device for suppressing an EMI effect.

According to the present invention, it is possible to implement a specific operation algorithm of a touch detection device capable of perfectly canceling an EMI radiation amount by considering different load characteristics including different electrode sizes, etc. for each row of a touch sensor.

Even though the present invention has been described above in relation to specific embodiments of the present invention, this is only an example and the present invention is not limited thereto. A person of ordinary skill in the technical field to which the present invention pertains may change or modify the described embodiments without departing from the scope of the present invention, and various modifications and variations are possible within the scope of equivalence of the technical idea of the present invention and the scope of the patent claims described below.

The invention claimed is:

1. A touch detection device comprising:
a panel including a plurality of electrodes regularly arranged in rows and columns; and
a sensor driver configured to perform a control operation so that a driving voltage having a waveform of a specific cycle is applied to the electrodes, wherein the sensor driver is configured to:
apply a sensing signal to a specific row and apply a first driving signal to at least one row adjacent to the specific row,
apply a second driving signal having a reverse phase to a phase of the first driving signal to consecutive rows adjacent to the at least one row,
apply a ground signal to a row immediately adjacent to the at least one row,
increase a first variable associated with a position to which the second driving signal is applied or a second variable associated with a number of consecutive rows to which the second driving signal is applied when an electromagnetic interference (EMI) level detected in the electrodes is greater than or equal to a reference value,
detect an EMI level of a configuration in which positions and a number of rows to which the second driving signal is applied have changed based on the first variable and the second variable, and
select a combination of rows to which the sensing signal, the first driving signal, the ground signal, and the second driving signal are applied when the EMI level of the changed configuration is less than the reference value.

2. The touch detection device according to claim 1, wherein:
the sensor driver is configured to:
apply the first driving signal of the driving voltage through electrodes in a second row in one direction adjacent to one side of a first row which is the specific row,
apply a voltage corresponding to ground through electrodes in a third row in one direction adjacent to one side of the second row,
apply the second driving signal having a reverse voltage waveform to a waveform of the voltage corresponding to ground or the driving voltage through electrodes in a fourth row in one direction adjacent to one side of the third row, and
sense a voltage through electrodes arranged in the specific row, and
a size of a third electrode in the third row to which the voltage corresponding to ground is applied is greater than a size of a second electrode in the second row to which the first driving signal is applied.

3. The touch detection device according to claim 2, wherein:
the sensor driver is configured to:
apply the first driving signal through electrodes in the second row in the other direction adjacent to the other side of the specific row,
apply the voltage corresponding to ground through electrodes in the third row in the other direction adjacent to the other side of the second row in the other direction, and
apply the voltage corresponding to ground or the second driving signal through electrodes in the fourth row in the other direction adjacent to the other side of the third row in the other direction, and
waveforms of voltages applied to both sides of the specific row are formed in a symmetrical form.

4. The touch detection device according to claim 2, wherein the sensor driver applies the second driving signal through electrodes in a fifth row in one direction adjacent to one side of the fourth row.

5. The touch detection device according to claim 4, wherein:

a size of a fourth electrode in the fourth row is the same as the size of the second electrode in the second row, and a size of the fifth electrode in the fifth row is the same as a size of a first electrode in the first row.

6. The touch detection device according to claim 4, wherein the sensor driver is configured to:

apply the voltage corresponding to ground to the fourth row when the same sensor types are applied to the third row and the fourth row, and apply the second driving signal through electrodes in a sixth row in one direction adjacent to one side of the fifth row.

7. The touch detection device according to claim 6, wherein:

a size of a fourth electrode in the fourth row is the same as the size of the third electrode in the third row, a size of the fifth electrode in the fifth row is the same as a size of a first electrode in the first row, and a size of a sixth electrode in the sixth row is the same as the size of the first electrode in the first row.

8. The touch detection device according to claim 4, wherein the sensor driver is configured to:

apply the second driving signal to the fourth row when different sensor types are applied to the third row and the fourth row, and apply the second driving signal through electrodes in a sixth row in one direction adjacent to one side of the fifth row.

9. The touch detection device according to claim 8, wherein:

the size of the second electrode in the second row is the same as a size of a first electrode in the first row, a size of a fourth electrode in the fourth row is greater than the size of the third electrode in the third row, and the size of the fourth electrode in the fourth row, a size of a fifth electrode in the fifth row, and a size of a sixth electrode in the sixth row are the same.

\* \* \* \* \*